United States Patent
Lan

(10) Patent No.: US 6,168,175 B1
(45) Date of Patent: Jan. 2, 2001

(54) KICK SCOOTER COMBINATION FRAME STRUCTURE

(76) Inventor: Mey-Chu Lan, 7F, No. 6, Lane 20, Sec. 4, San Ho Rd., San-Chung City, Taipei Hsien (TW)

( * ) Notice: Under 35 U.S.C. 154(b), the term of this patent shall be extended for 0 days.

(21) Appl. No.: 09/588,102

(22) Filed: May 31, 2000

(30) Foreign Application Priority Data

Mar. 9, 2000 (TW) .............................................. 089203727

(51) Int. Cl.$^7$ ............................. B62M 1/00; B62K 17/00; B62K 21/00
(52) U.S. Cl. ................................. 280/87.041; 280/87.042; 280/263; 280/270
(58) Field of Search ........................ 280/87.041, 87.042, 280/263, 270, 274

(56) References Cited

U.S. PATENT DOCUMENTS

| | | | | |
|---|---|---|---|---|
| 1,227,888 | * | 5/1917 | Converse | 280/87.041 |
| 1,279,966 | * | 9/1918 | Baker | 280/87.042 |
| 1,563,766 | * | 12/1925 | McLaren | 280/87.041 |
| 1,658,068 | * | 2/1928 | White | 280/87.041 |
| 1,689,916 | * | 10/1928 | Fisher | 280/87.041 |
| 1,701,410 | * | 2/1929 | Hornquist | 280/87.041 |
| 1,707,831 | * | 4/1929 | Wayerski | 280/87.041 |
| 1,844,305 | * | 2/1932 | White | 280/87.041 |
| 2,439,556 | * | 4/1948 | Bancroft | 280/87.041 |
| 2,474,946 | * | 7/1949 | Kinslow | 280/87.042 |
| 3,140,100 | * | 7/1964 | Nichols et al. | 280/87.041 |
| 4,179,134 | * | 12/1979 | Atkinson | 280/87.042 |
| 4,203,610 | * | 5/1980 | Mihalik | 280/87.041 |
| 4,204,698 | * | 5/1980 | Mihalik | 280/87.041 |
| 4,274,647 | * | 6/1981 | Drake, Jr. | 280/87.042 |
| 4,775,162 | * | 10/1988 | Chao | 280/87.041 |
| 4,799,701 | * | 1/1989 | Lindau et al. | 280/87.041 |
| 4,799,702 | * | 1/1989 | Wang | 280/87.041 |

* cited by examiner

Primary Examiner—Brian L. Johnson
Assistant Examiner—Joselyn Z. Sliteris
(74) Attorney, Agent, or Firm—Pro-Techtor International Services

(57) ABSTRACT

A kick scooter combination frame structure is constructed to include a handlebar and front fork assembly holding a front wheel, a head frame, the head frame having a vertical tube coupled to the handlebar and front fork assembly and two parallel lugs extended from the periphery of the vertical tube, and a footplate pivoted to the head frame and supported on a rear wheel, the footplate having a front opening, which receives the lugs of the head frame, and two longitudinal mounting rails perpendicularly raised from a bottom side wall thereof and reinforced with reinforcing ribs, the mounting rails each having a plurality of mounting holes respectively fastened to respective mounting holes on the lugs of the head frame by screw bolts.

2 Claims, 6 Drawing Sheets

KICK SCOOTER COMBINATION FRAME STRUCTURE

BACKGROUND OF THE INVENTION

The present invention relates to kick scooters, and more particularly to a combination frame structure for a kick scooter.

FIG. 1 shows a kick scooter according to the prior art. The frame structure of this structure of kick scooter is generally comprised of a handlebar and front fork assembly A, a footplate C, an oblique bar B and a rear wheel holder frame D. The handlebar and front fork assembly A is supported on a front wheel. The oblique bar B has a front end welded to a head tube at the handlebar and front fork assembly A, and a rear end welded to the footplate C. The footplate C has a rear end welded to the rear wheel holder frame D. This kick scooter frame structure has drawbacks. Because the head tube at the handlebar and front fork assembly A, the oblique bar B, the footplate C and the rear wheel holder frame D are respectively fastened together by welding, the fabrication procedure of the kick scooter is complicated, and the welding procedure greatly increases the manufacturing cost of the kick scooter. During welding, waste gas is produced to pollute the air, and produced sparks, bright light and heat may cause damage to the worker's eyes or body. After welding, the welding areas E must be washed with diluted sulfuric acid and clean water, and then polished after washing. Further, the welding areas E wear quickly with the use of the kick scooter, and tend to be forced to break when the kick scooter moves over an uneven road surface or encounters impact.

SUMMARY OF THE INVENTION

The present invention provides a combination frame structure for a kick scooter, which eliminates the aforesaid drawbacks. It is one object of the present invention to provide a combination frame structure for a kick scooter, which is easy and inexpensive to manufacture. It is another object of the present invention to provide a combination frame structure for a kick scooter, which eliminates a welding process. It is still another object of the present invention to provide a combination frame structure for a kick scooter, which is strong and durable in use. According to one aspect of the present invention, the kick scooter combination frame structure comprises a handlebar and front fork assembly holding a front wheel, a head frame, the head frame having a vertical tube coupled to the handlebar and front fork assembly and two parallel lugs extended from the periphery of the vertical tube, and a footplate pivoted to the head frame and supported on a rear wheel, the footplate having a front opening, which receives the lugs of the head frame, and two longitudinal mounting rails perpendicularly raised from a bottom side wall thereof, the mounting rails each having a plurality of mounting holes respectively fastened to respective mounting holes on the lugs of the head frame by screw bolts. According to another aspect of the present invention, two reinforcing ribs are respectively fastened to the mounting rails and the lugs of the head frame to reinforce the structural strength of the combination frame structure.

DETAILED DESCRIPTION OF THE PREFERRED EMBODIMENT

Figure 1:
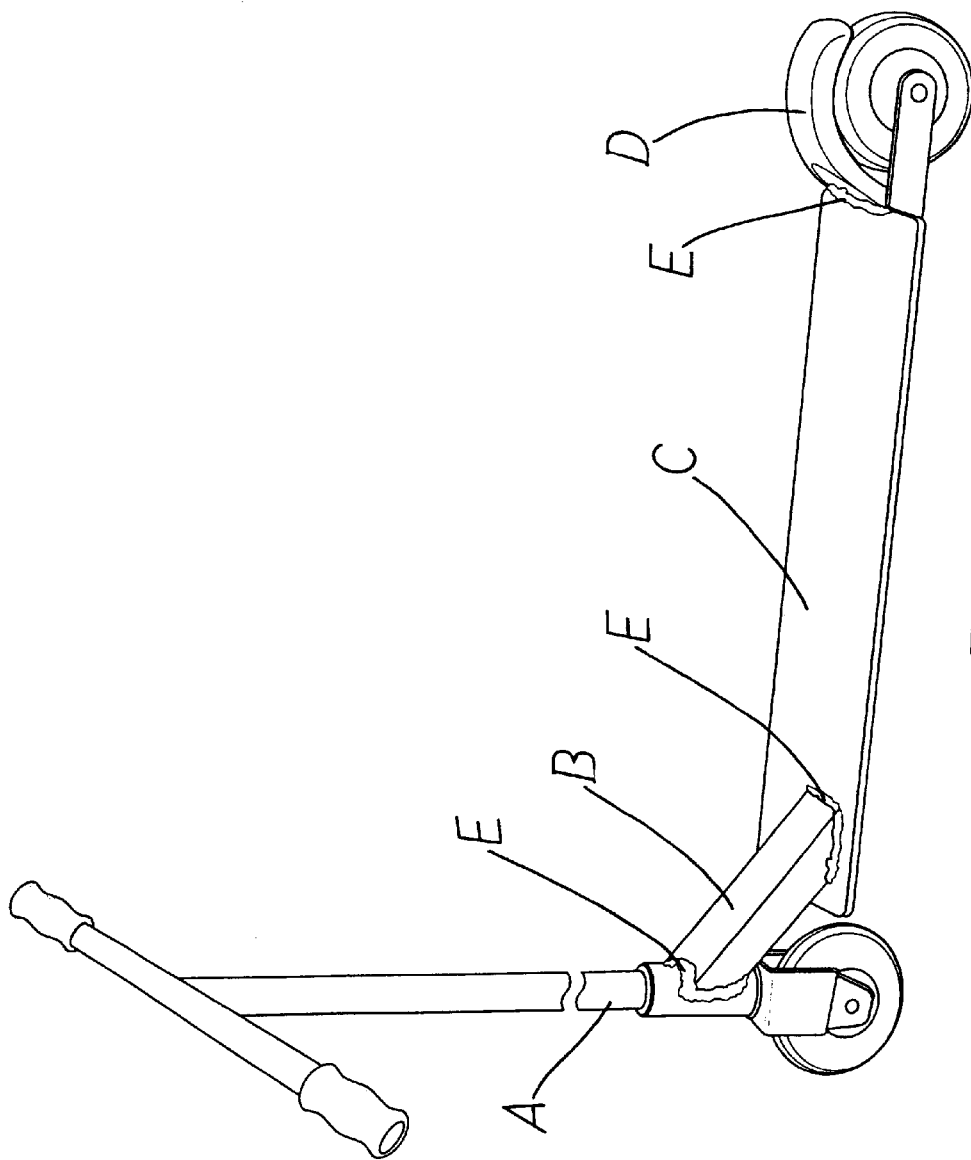
FIG. 1 illustrates a kick scooter according to the prior art.

Referring to FIGS. from 2 through 4, a kick scooter combination frame structure 1 is shown comprised of a handlebar and front fork assembly 11 holding a front wheel 14, a head frame 12 pivoted to the handlebar and front fork assembly 11, and a footplate 13 having a front side coupled to the head frame 12 and a rear side mounted with a rear wheel 15.

Figure 2:
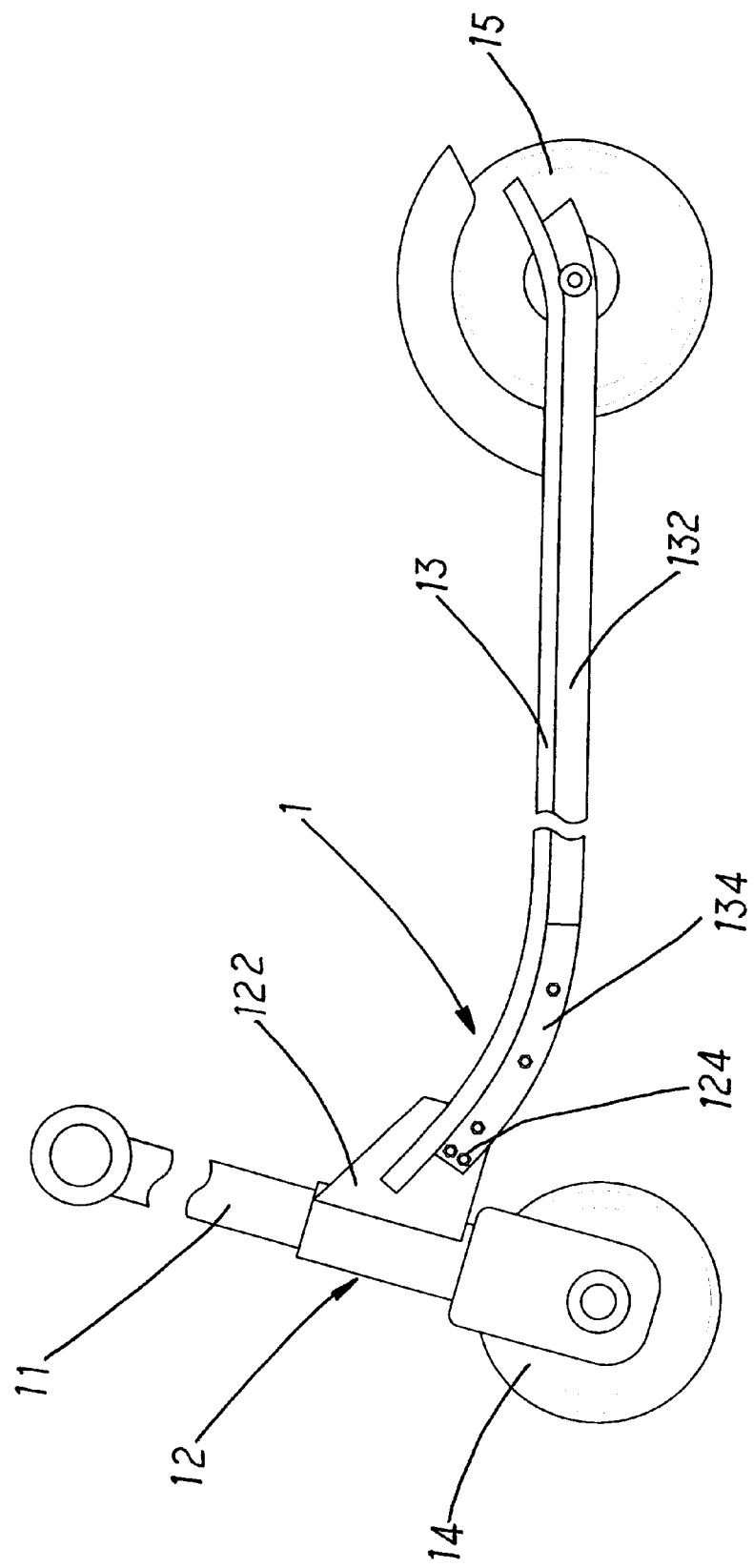
FIG. 2 is a side plain view of a kick scooter constructed according to the present invention.
Figure 3:
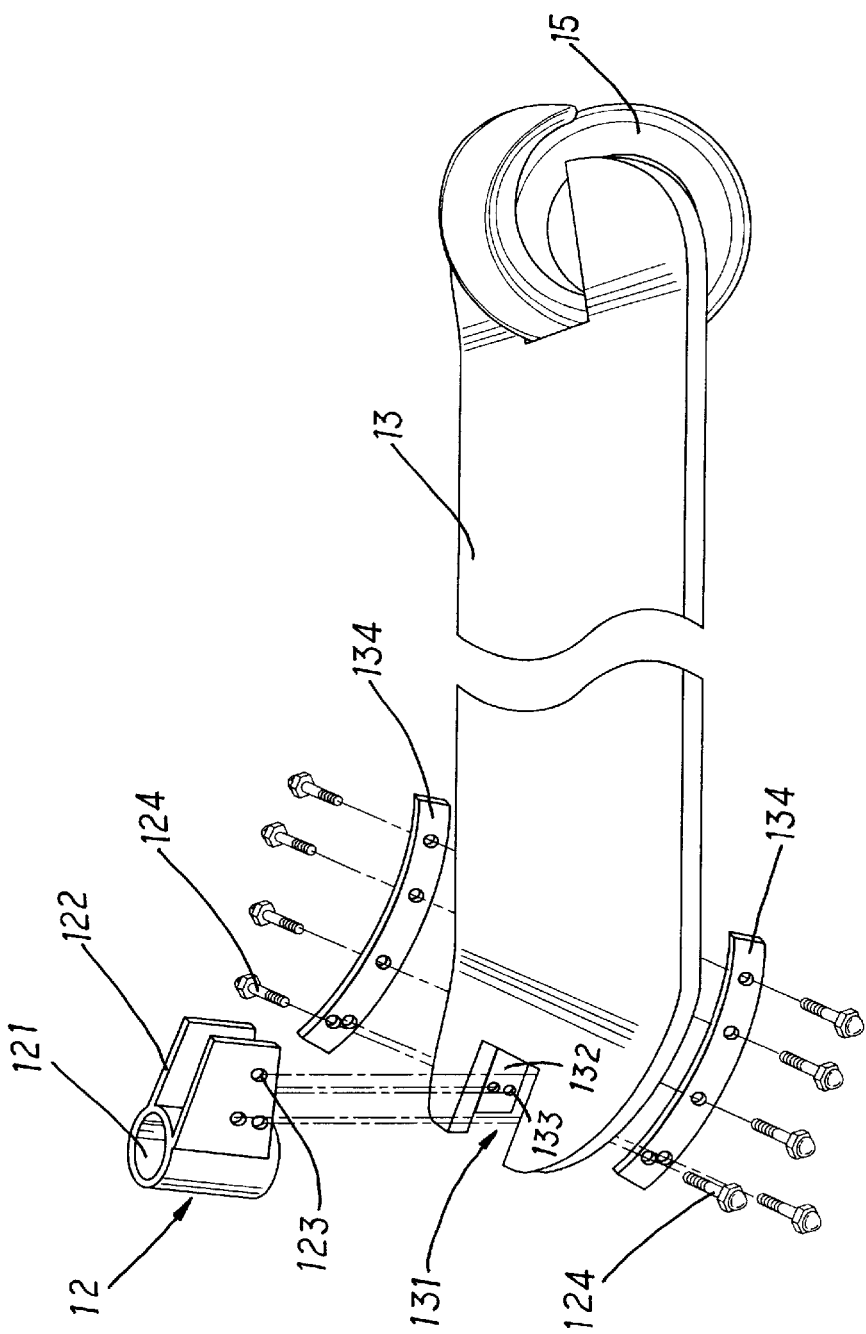
FIG. 3 is an exploded view of a part of the present invention.
Figure 4:
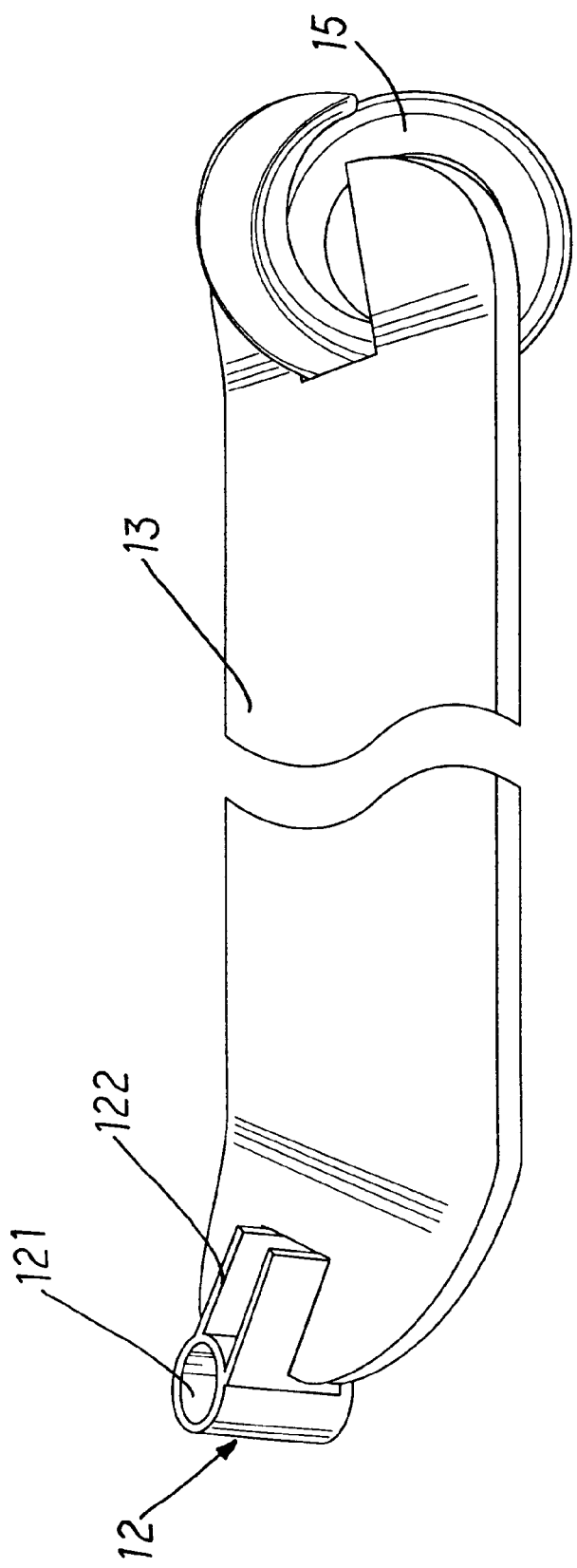
FIG. 4 is an assembly view of FIG. 3.
Figure 5:
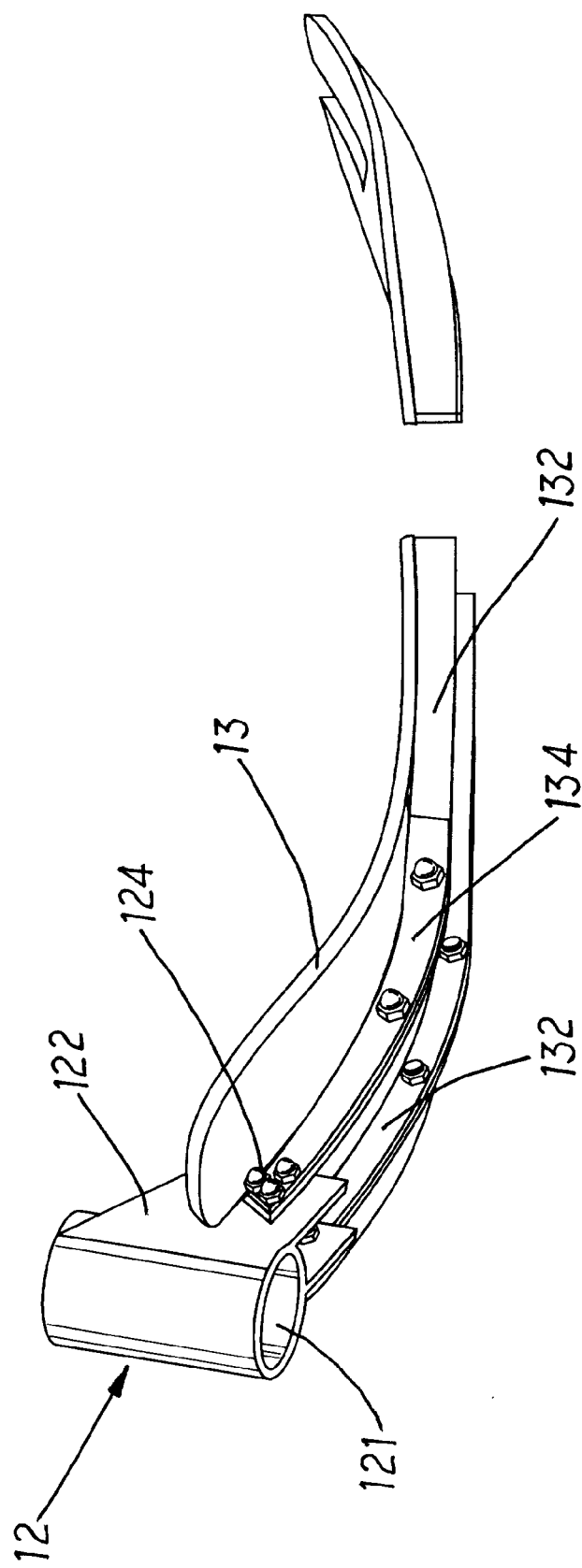
FIG. 5 is a perspective bottom side view of the assembly shown in FIG. 4.
Figure 6:
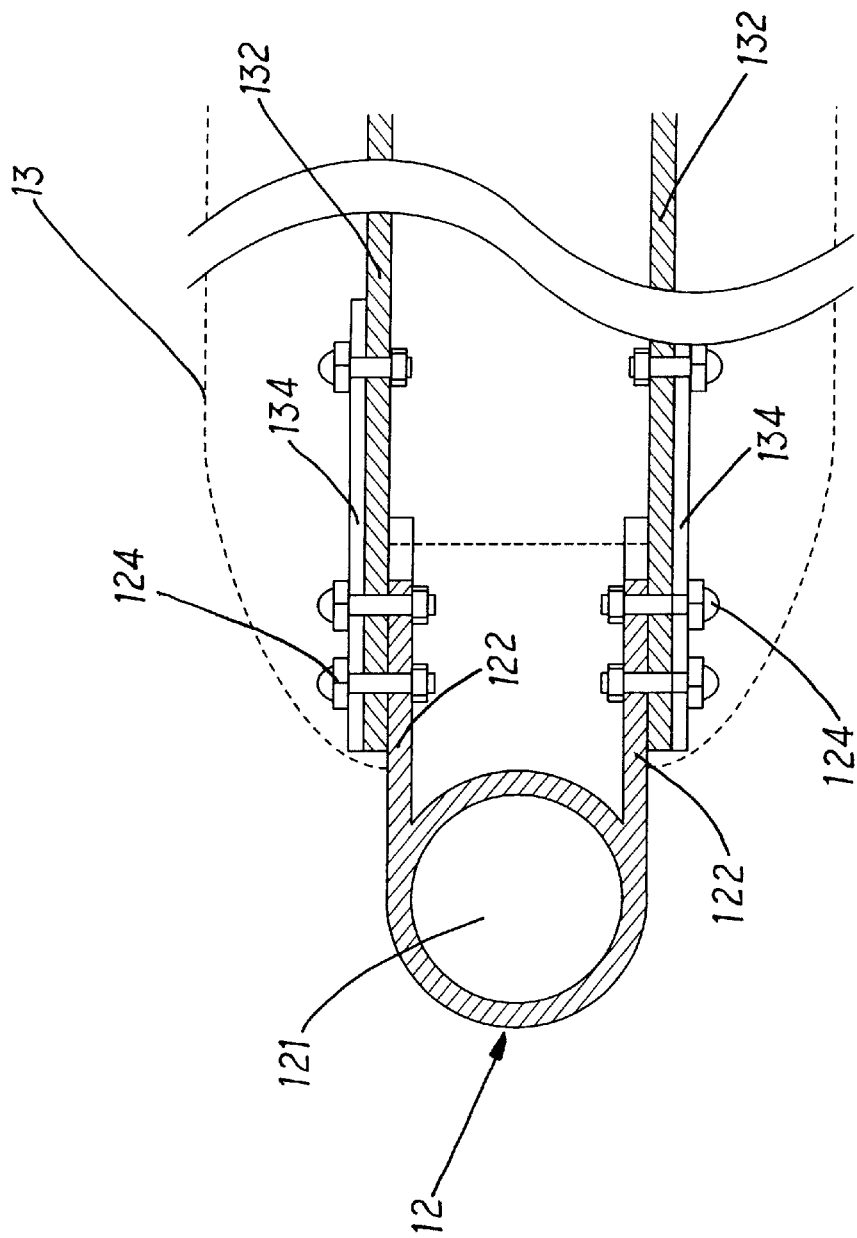
FIG. 6 is a top view in section in an enlarged scale of the assembly shown in FIG. 4.

Referring to FIGS. 5 and 6 and from FIGS. 2 through 4 again, the head frame 12 and the footplate 13 are respectively made of metal in integrity. The head frame 12 comprises a tube 121 vertically disposed at its front side and coupled to the handlebar and front fork assembly 11, and two parallel lugs 122 backwardly extended from the periphery of the tube 121. The lugs 122 each have a plurality of mounting holes 123. The footplate 13 is made of metal with its front side curved forwardly upwards, comprising a front opening 131 at the front side thereof, and two longitudinal mounting rails 132 perpendicularly raised from the bottom side wall thereof and extended from the front side to the rear side and disposed at two opposite lateral sides of the front opening 131. The mounting rails 132 each have a plurality of mounting holes 133 corresponding to the mounting holes 123 on the lugs 122 of the head frame 12. The lugs 122 of the head frame 12 are inserted into the front opening 131, and screw bolts 124 are respectively fastened to the mounting holes 133 on the mounting rails 132 and the mounting holes 123 on the lugs 122 to fixedly secure the footplate 13 to the head frame 12.

Referring to FIGS. from 2 through 6 again, during the assembly process, the tube 121 of the head frame 12 is sleeved onto the handlebar and front fork assembly 11 and supported on the front fork of the handlebar and front fork assembly 11, and then the two parallel lugs 12 are inserted into the front opening 131 of the footplate 13 and respectively attached to the mounting rails 132, and then screw bolts 124 are respectively fastened to the mounting holes 133 on the mounting rails 132 and the mounting holes 123 on the lugs 122 to fixedly secure the footplate 13 to the head frame 12.

Referring to FIGS. 2, 3 and 5 again two reinforcing ribs 134 are respectively fastened to the mounting rails 132 and the lugs 122 of the head frame 12 to reinforce the structural strength of the combination frame structure 1.

What the invention claimed is:

1. A kick scooter combination frame structure comprising a handlebar and front fork assembly holding a front wheel, a head frame pivoted to said handlebar and front fork assembly, and a footplate, said footplate having a front side thereof coupled to said head frame and a rear side thereof mounted with a rear wheel, wherein said footplate comprises a front opening, and two longitudinal mounting rails perpendicularly raised from a bottom side wall thereof and extended from the front side toward the rear side thereof at two opposite lateral sides of said front opening, said mounting rails each having a plurality of mounting holes; said head frame comprises a tube vertically disposed at a front side thereof and coupled to said handlebar and front fork assembly, and two parallel lugs backwardly extended from the periphery of said tube and inserted into the front opening of said footplate, said lugs each having a plurality of mounting holes respectively fastened to the mounting holes on the mounting rails of said footplate by screw bolts.

2. The kick scooter combination frame structure of claim 1 wherein said footplate further comprises two reinforcing ribs respectively fastened to the mounting rails of said footplate and the lugs of said head frame, and the front side of said footplate is curved forwardly upwards.

* * * * *